Patented May 31, 1938

2,119,280

UNITED STATES PATENT OFFICE 2,119,280

SEALING MATERIAL FOR PRODUCING CAN SEALS AND THE LIKE

Alfred L. Kronquest and Samuel C. Robison, Syracuse, N. Y., assignors to Continental Can Company, Inc., New York, N. Y., a corporation of New York No Drawing. Application December 1, 1932, Serial No. 645,316

5 Claims. (Cl. 106—23)

This invention relates to improvements in sealing materials for producing seals between can bodies and their ends, and for like purposes; and more particularly relates to a composition which is stable over long periods of time, both in the form as delivered to the trade for employment, and when placed upon the cans for establishing seals.

One of the features of the present invention is the employment of a synthetic material as a base for the composition, in conjunction with plasticizing, adhesion-producing and filling ingredients which modify the base material and make possible the production of an emulsion in water suspension.

An illustrative example of practicing the invention comprises the following materials:

| | Ounces |
|---|---|
| Polymerized chloro-2-butadiene-1,3 | 10 |
| Jellified oil | 4 |
| Diatomaceous filler | 8 |
| Titanium oxide | 2 |
| Bentonite | 1 |
| Glue in solution | 3 |
| Ester gum | 4 |
| Alkyd resin | 4 |

The polymerized chloro-2-butadiene-1,3 is a rubber-like material which may be produced (1) by the addition of hydrogen chloride to vinyl-acetylene, for the production of chloro-2-butadiene-1,3; and (2) the polymerization of this chloro-2-butadiene-1,3, which may occur spontaneously in a closed vessel at normal temperature, or through the action of a catalyst such as oxygen or a peroxide, or by the action of increased temperature, pressure and light effects, or by polymerization at a temperature of around 30° C. while subjected to light as, for example, the illumination of a tungsten incandescent lamp or a mercury arc in glass. It is preferred to use the alpha modification of this compound (known as alpha-chloroprene and obtainable commercially as Duprene Type A), as upon heating at elevated temperatures for a short while it is converted into the mu form.

The jellified oil operates as a plasticizer and insoluble inorganic filler and may, for example, be made by heating a mixture of 8 ounces of China-wood oil with 1 ounce of rapeseed oil to 600° F. until gelation occurs, whereupon the mass is poured out to cool.

The glue solution is prepared by mixing 3 ounces of a strong (preferably casein) glue with 9 ounces of warm water and gradually heated until dispersion has occurred. It has been found that the casein glue obtainable commercially under the name "Casco" is excellently adapted for the purpose. It operates as a dispersing agent and assists in producing adhesion.

The bentonite not only operates as a filler, but also has the power of assisting emulsification of the composition as it exerts a dispersing power upon the materials.

The diatomaceous filler is finely divided and is inert chemically. The type sold under the name "Superfloss" has been found satisfactory, as it is mainly pure silica in a fine state of division. The titanium oxide is likewise a filler. They confer bulk and stiffness to the particles of the composition without affecting its resistance to the destructive influences of time, temperature, or solvents.

The ester gum is a modified resin, and may be prepared, for example, by heating rosin with glycerol in the usual way for esterification.

The alkyd resin is preferably a condensation product of modified glycerol-phthalic anhydride type. Such a material as that obtainable commercially under the name "Glyptal Resin R. C. 1" has been found excellently adapted to the present composition as it does not harden or oxidize, in the composition, due to aging.

The resins increase cohesion and toughness and produce a ready adhesion of the material to the can end.

The composition may be made as follows:

The glue is dissolved in water, and the bentonite is mixed therewith to form a uniform suspension.

The polymerized chloro-2-butadiene-1,3 is milled for ten minutes at between 212 and 250° F., and the jellified oil is added while milling is continued. The diatomaceous filler and titanium oxide are incorporated as soon as possible after the base and jellified oil are brought together and begin to blend. The glue solution containing the bentonite is then introduced, and the milling is continued.

The ester gum and alkyd resin are heated to approximately 400° F. and placed in a steam heated mixer, and the mixer started. The batch from the milling operation, as produced above, is introduced into the mixer in small portions at a time. When a uniform mass has been produced, the temperature is adjusted to approximately 200° F. while the mixing continues, and then 5% ammonium hydroxide solution is added to the batch in small portions, until the point is reached where the phase is about to change. The ammonium hydroxide solution is added very slowly at this point so that a uniform dispersion occurs, and the reversal of phase will occur throughout the mass substantially at the same time, and therewith result in the production of a colloidal suspension in which the disperse phase (not comprising the mixed base and additive ingredients) is present in very small particles. After the emulsion breaks, i. e. the phase reverses, the composition can be diluted rather rapidly with the 5% ammonium hydroxide solution to a desired viscosity appropriate for the coating. This dilution may occur either in the course of manufacture, or the material may be stored and distributed in the condition presented at the change of phase, and then made up in bulk to the desired viscosity by agitation and mixing with the necessary quantity of 5% of ammonium hydroxide solution. The ammonium hydroxide operates as a peptizer for the colloidal solution which thus results.

The composition thus produced may be employed in the usual way, as for example, to fill the channel on a can end, and upon drying gives off its water and ammonia and thus deposits a very tenaciously adhering film which is smooth and resistant to abrasion and which does not boil off or discolor when treated with boiling water for a period of one-half hour.

While a specific example of materials and proportions is given above, it is obvious that these may be varied within many ways within the scope of the appended claims.

Having thus described the invention, what we claim as new and desire to secure by Letters Patent, is:—

1. A sealing material for tin cans and like containers comprising a water suspension of particles including polymerized chloro-2-butadiene-1,3, jellified drying oil, alkyd resin and ester gum.

2. A sealing material for tin cans and like containers comprising particles each including polymerized chloro-2-butadiene-1,3, jellified drying oil, alkyd resin, ester gum and glue all intimately mixed, and aqueous ammonium hydroxide solution in which said particles are suspended.

3. A sealing material for tin cans and like containers comprising particles each including polymerized chloro-2-butadiene-1,3, jellified drying oil, alkyd resin, ester gum and bentonite all intimately mixed, and aqueous ammonium hydroxide solution in which said particles are suspended.

4. A sealing material for tin cans and like containers comprising particles each including polymerized chloro-2-butadiene-1,3, jellified drying oil, alkyd resin, ester gum, glue, bentonite and finely divided inorganic fillers all intimately mixed, and aqueous ammonium hydroxide solution in which said particles are suspended.

5. A tin can or like container having a body portion and a cover portion, and a seal between said portions comprising a deposit from water suspension of particles including polymerized chloro-2-butadiene-1,3, and a plasticizer thereof, and a quantity of comminuted inorganic filler substantially equal to the quantity of chloro-2-butadiene-1,3.

ALFRED L. KRONQUEST.
SAMUEL C. ROBISON.